US010221798B2

(12) United States Patent
Mischler et al.

(10) Patent No.: US 10,221,798 B2
(45) Date of Patent: Mar. 5, 2019

(54) METHOD AND SYSTEMS FOR AIRFLOW CONTROL

(71) Applicant: General Electric Company, Schenectady, NY (US)

(72) Inventors: James Robert Mischler, Girard, PA (US); Luke Michael Henry, Erie, PA (US); David Zielinski, Erie, PA (US)

(73) Assignee: GE Global Sourcing LLC, Norwalk, CT (US)

( * ) Notice: Subject to any disclaimer, the term of this patent is extended or adjusted under 35 U.S.C. 154(b) by 199 days.

(21) Appl. No.: 14/955,106

(22) Filed: Dec. 1, 2015

(65) Prior Publication Data
US 2017/0152806 A1 Jun. 1, 2017

(51) Int. Cl.
*B60T 7/12* (2006.01)
*F02D 41/24* (2006.01)
(Continued)

(52) U.S. Cl.
CPC ..... *F02D 41/2422* (2013.01); *F02D 41/0002* (2013.01); *F02D 41/005* (2013.01); *F02D 41/0052* (2013.01); *F02D 41/0295* (2013.01); *F02D 41/144* (2013.01); *F02D 41/146* (2013.01); *F02D 41/1458* (2013.01); *F02D 41/1461* (2013.01); *F02D 2041/1412* (2013.01); *F02D 2200/0404* (2013.01); *F02D 2200/0406* (2013.01); *F02D 2200/0411* (2013.01);
(Continued)

(58) Field of Classification Search
CPC ............. F02D 41/2422; F02D 41/0002; F02D 41/0052; F02D 41/0295; F02D 41/146; F02D 2200/0404; F02D 2200/703

USPC .................................. 123/678; 701/103, 108
See application file for complete search history.

(56) References Cited

U.S. PATENT DOCUMENTS 4,860,716 A 8/1989 Deutschmann
5,802,846 A 9/1998 Bailey
(Continued)

FOREIGN PATENT DOCUMENTS

EP 0632191 A1 2/1994
EP 1217199 B1 6/2002
(Continued)

OTHER PUBLICATIONS

"A Unified Framework for the Study of Anti- Windup Designs", Mayuresh V. Kothare, Peter J. Campo, Manfred Morari and Carl N. Nett; Control and Dynamical Systems, California Institute of Technology, Pasadena, CA 91125CDS, Technical Memorandum No. CIT-CDS 93-011, Jun. 17, 1993.
(Continued)

*Primary Examiner* — Hung Q Nguyen
*Assistant Examiner* — Anthony Taylor, Jr.
(74) *Attorney, Agent, or Firm* — McCoy Russell LLP

(57) ABSTRACT

Various methods and systems are provided for controlling emissions. In one example, a controller is configured to respond to a sensed or estimated intake oxygen fraction by controlling an exhaust gas recirculation (EGR) amount supplied to an engine to maintain a level of particulate matter (PM) in a determined PM range and a level of NOx in a determined NOx range, and adjusting a target intake manifold oxygen fraction or target intake manifold EGR fraction in response to a NOx sensor feedback signal.

13 Claims, 8 Drawing Sheets

(51) Int. Cl.
*F02D 41/00* (2006.01)
*F02D 41/02* (2006.01)
*F02D 41/14* (2006.01)

(52) U.S. Cl.
CPC ............... *F02D 2200/0414* (2013.01); *F02D 2200/703* (2013.01); *Y02T 10/42* (2013.01); *Y02T 10/47* (2013.01)

(56) References Cited

U.S. PATENT DOCUMENTS

| | | | | |
|---|---|---|---|---|
| 6,000,385 | A * | 12/1999 | Fukuma | F02D 41/0072 123/568.16 |
| 6,039,025 | A * | 3/2000 | Iwano | F02D 41/0065 123/399 |
| 6,205,785 | B1 | 3/2001 | Coleman | |
| 6,412,279 | B1 | 7/2002 | Coleman | |
| 6,422,217 | B1 | 7/2002 | Feucht | |
| 6,425,381 | B1 | 7/2002 | Rammer | |
| 6,543,230 | B1 | 4/2003 | Schmid | |
| 6,697,729 | B2 * | 2/2004 | Wright | F01N 9/005 123/568.21 |
| 6,752,132 | B2 | 6/2004 | Remmels | |
| 6,789,531 | B1 | 9/2004 | Remmels | |
| 6,814,060 | B1 * | 11/2004 | Solomons | F02D 41/401 123/357 |
| 6,857,263 | B2 * | 2/2005 | Gray, Jr. | F01N 3/035 123/698 |
| 6,877,492 | B1 | 4/2005 | Osterwald | |
| 7,055,508 | B2 * | 6/2006 | Matsunaga | F02D 41/0072 123/568.21 |
| 7,267,117 | B2 * | 9/2007 | Tonetti | F02D 41/0072 123/568.11 |
| 7,512,479 | B1 * | 3/2009 | Wang | F02D 41/0002 123/568.21 |
| 7,681,394 | B2 * | 3/2010 | Haugen | F02D 41/0007 60/603 |
| 7,757,659 | B2 * | 7/2010 | Kurotani | F02D 19/0694 123/295 |
| 7,788,923 | B2 | 9/2010 | Rowells | |
| 7,941,999 | B2 | 5/2011 | Kasper | |
| 7,946,162 | B2 * | 5/2011 | Vennettilli | F02D 41/18 73/114.31 |
| 7,958,730 | B2 | 6/2011 | Stewart | |
| 8,010,276 | B2 * | 8/2011 | Oehlerking | F02D 41/0007 123/568.21 |
| 8,033,108 | B2 | 10/2011 | Ishikawa | |
| 8,103,429 | B2 * | 1/2012 | Sivasubramaniam | F02D 41/0235 123/672 |
| 8,191,369 | B2 | 6/2012 | Geyer | |
| 8,522,551 | B2 | 9/2013 | Tomita | |
| 8,601,813 | B2 * | 12/2013 | Shutty | F02D 41/0072 60/605.2 |
| 8,677,748 | B2 | 3/2014 | Brahma | |
| 8,776,505 | B2 * | 7/2014 | Lee | F02D 41/0072 60/274 |
| 8,776,506 | B2 * | 7/2014 | Lee | F01N 13/009 60/274 |
| 8,826,644 | B2 * | 9/2014 | Ponnathpur | F01N 3/2066 60/274 |
| 9,181,862 | B2 * | 11/2015 | Petrovic | F02B 47/08 |
| 9,228,511 | B2 * | 1/2016 | Zhu | F02D 41/0072 |
| 9,273,616 | B2 * | 3/2016 | Ueno | F02D 21/08 |
| 9,518,519 | B2 * | 12/2016 | Dane | F02D 21/08 |
| 9,605,613 | B2 * | 3/2017 | Sarlashkar | F02D 41/0235 |
| 9,726,091 | B2 * | 8/2017 | Ruth | F02D 41/005 |
| 2002/0100463 | A1 * | 8/2002 | Jaliwala | F02D 41/0072 123/568.21 |
| 2004/0065309 | A1 | 4/2004 | Verschoor | |
| 2004/0089061 | A1 * | 5/2004 | Matsunaga | F02D 41/0072 73/114.76 |
| 2006/0021347 | A1 | 2/2006 | Sun et al. | |
| 2006/0070381 | A1 | 4/2006 | Parlow | |
| 2007/0193270 | A1 | 8/2007 | Roozenboom et al. | |
| 2008/0000228 | A1 | 1/2008 | Kieser | |
| 2008/0127952 | A1 | 6/2008 | Hatamura | |
| 2008/0208432 | A1 | 8/2008 | Hu | |
| 2008/0216475 | A1 | 9/2008 | Kasper et al. | |
| 2009/0077968 | A1 | 3/2009 | Sun | |
| 2009/0133399 | A1 | 5/2009 | Keyes et al. | |
| 2009/0199825 | A1 | 8/2009 | Piper et al. | |
| 2009/0293477 | A1 | 12/2009 | Shu et al. | |
| 2009/0308070 | A1 | 12/2009 | Alger, II et al. | |
| 2010/0037601 | A1 | 2/2010 | Pierpont | |
| 2010/0131181 | A1 * | 5/2010 | Herrmann | F02D 41/0052 701/108 |
| 2011/0000459 | A1 | 1/2011 | Elsaer | |
| 2011/0088674 | A1 * | 4/2011 | Shutty | F02D 41/0007 123/568.21 |
| 2012/0137660 | A1 * | 6/2012 | Yan | F01N 3/0253 60/276 |
| 2012/0253644 | A1 * | 10/2012 | Port | F02D 41/0052 701/109 |
| 2013/0024086 | A1 * | 1/2013 | Henry | F02D 41/021 701/102 |
| 2013/0081444 | A1 * | 4/2013 | Vartia | F02D 41/029 73/23.33 |
| 2014/0060506 | A1 * | 3/2014 | Shaver | F02D 13/0226 123/672 |
| 2014/0251287 | A1 * | 9/2014 | Takezoe | F02D 41/0052 123/568.11 |
| 2015/0113948 | A1 * | 4/2015 | Surnilla | F02D 41/005 60/274 |
| 2016/0131057 | A1 * | 5/2016 | Lahti | F02D 41/0077 701/103 |

FOREIGN PATENT DOCUMENTS

| | | |
|---|---|---|
| EP | 1258603 A1 | 11/2002 |
| GB | 2280222 A | 1/1995 |
| GB | 2458968 A | 10/2009 |
| JP | 2008128029 A | 6/2008 |
| JP | 2008163794 A | 7/2008 |
| WO | 1999035391 A1 | 7/1999 |
| WO | 2006119866 A1 | 11/2006 |
| WO | 2007008196 A1 | 1/2007 |
| WO | 2009136562 A1 | 11/2009 |

OTHER PUBLICATIONS

"An Algorithm for Fast Optimal Latin Hypercube Design of Experiments", Felipe A. C. Viana, Oct. 12, 2009.

* cited by examiner

METHOD AND SYSTEMS FOR AIRFLOW CONTROL

BACKGROUND

Technical Field

Embodiments of the subject matter disclosed herein relate to controlling engine exhaust gas recirculation flow.

Discussion of Art

Engine systems may be configured to maintain emissions within regulated limits while providing optimal fuel economy. Ambient conditions may impact emissions, and thus engine systems may be configured to maintain emissions over a range of ambient conditions. For example, air flow through a turbocharger and heat rejection by an intercooler may each be impacted by ambient temperature and pressure. Changes in airflow may impact air-fuel ratio and intake manifold oxygen concentration, which in turn may impact particulate matter and NOx production. Likewise, changes in heat rejection from the intercooler may impact manifold air temperature, which in turn may impact NOx and particulate matter production.

BRIEF DESCRIPTION

In an embodiment, a system for an engine (e.g., an engine control system) includes a controller that is configured to respond to a sensed or estimated intake oxygen fraction by controlling an exhaust gas recirculation (EGR) amount supplied to the engine to maintain a level of particulate matter (PM) in a determined PM range and a level of NOx in a determined NOx range. The controller is further configured to adjust a target intake manifold oxygen fraction or target intake manifold EGR fraction in response to a NOx sensor feedback signal.

DETAILED DESCRIPTION

The following description relates to embodiments of systems and methods of engine control, for maintaining engine system exhaust emissions, such as particulate matter (PM) and NOx, within respective ranges. A variety of engine operating parameters, including sensed or estimated intake oxygen fraction, intake air flow rate (and hence air flow through a turbocharger), and intake manifold temperature may impact the production of engine-out emissions. In one embodiment, emissions may be controlled by adjusting exhaust gas recirculation (EGR) flow based on NOx emissions. However, EGR flow frequently does not have a consistent relationship with NOx emissions. Further, actual EGR valve position (which may be controlled to control the EGR flow) may not have a consistent relationship with EGR flow. This makes NOx emission control complex, particularly in engine systems that utilize a donor-cylinder based EGR system.

To respond to such changing operating parameters to keep the emissions within range, a controller may be configured to change an exhaust gas recirculation (EGR) amount to maintain PM and NOx within a range, and then further adjust a target intake manifold oxygen fraction or target intake manifold EGR fraction based on NOx sensor feedback. The controller may be configured to convert the target intake manifold oxygen fraction to a fresh air fraction reference, for example, which may be used to determine EGR valve position. Further, the EGR valve position may be measured and used along with various air flow model outputs to provide feedback control. By utilizing a fresh air or EGR fraction-based EGR valve position control, rather than an EGR flow-based control, the controller complexity may be reduced, additional feedforward and feedback control may be added to improve responsiveness, and anti-windup of valve position may be enabled.

Figure 1:
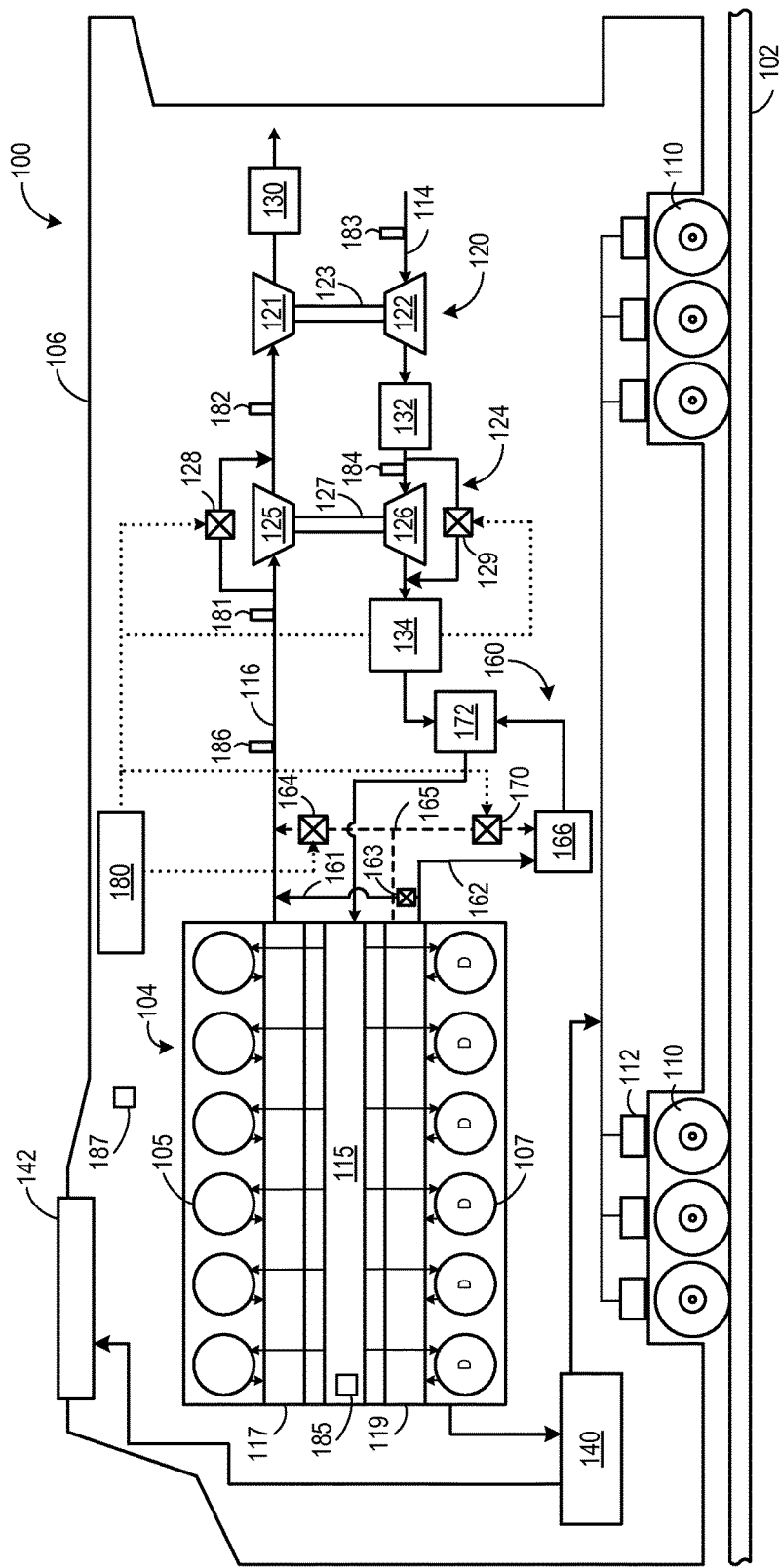
FIG. 1 shows a schematic diagram of a vehicle according to an embodiment of the invention.
Figure 6A:
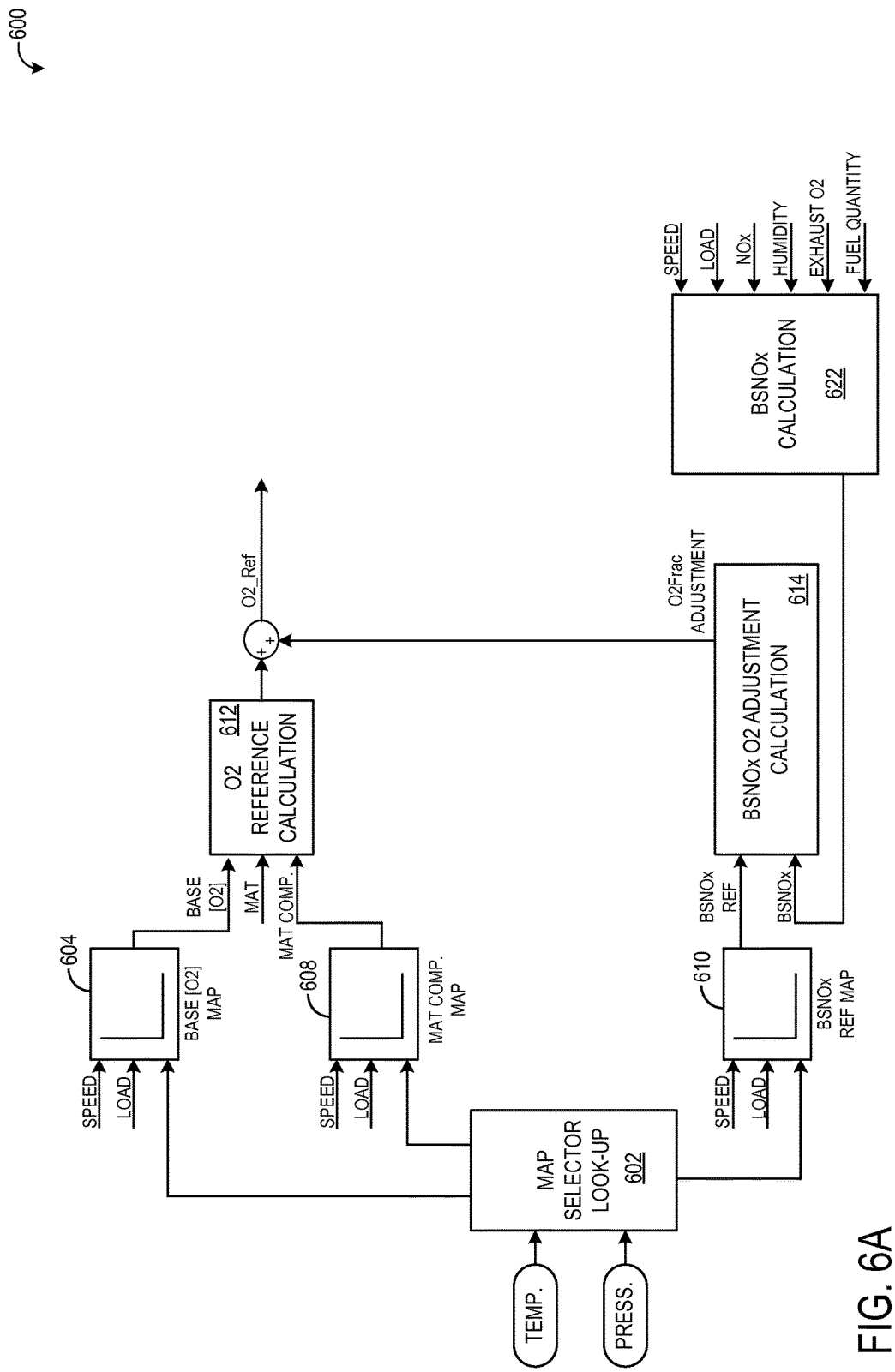
FIGS. 6A, 6B, and 7 are control diagrams illustrating engine operation control according to the methods of FIGS. 2-5.
Figure 6B:
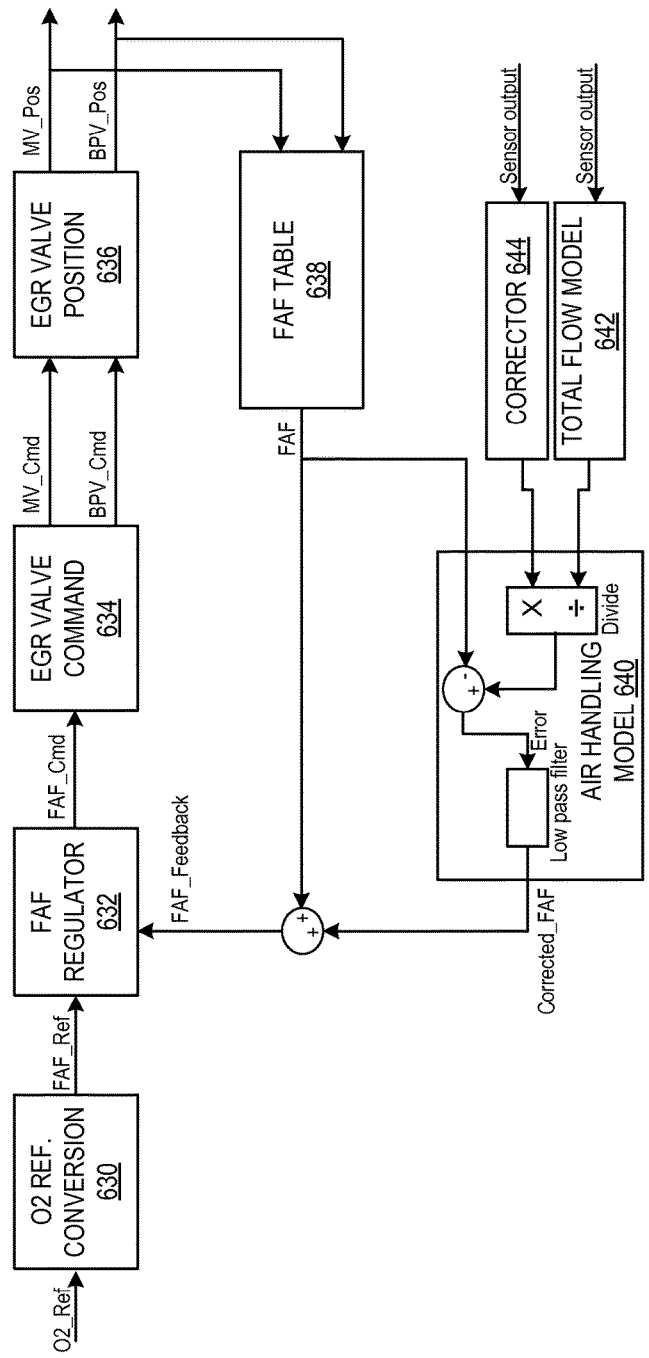
Figure 7:
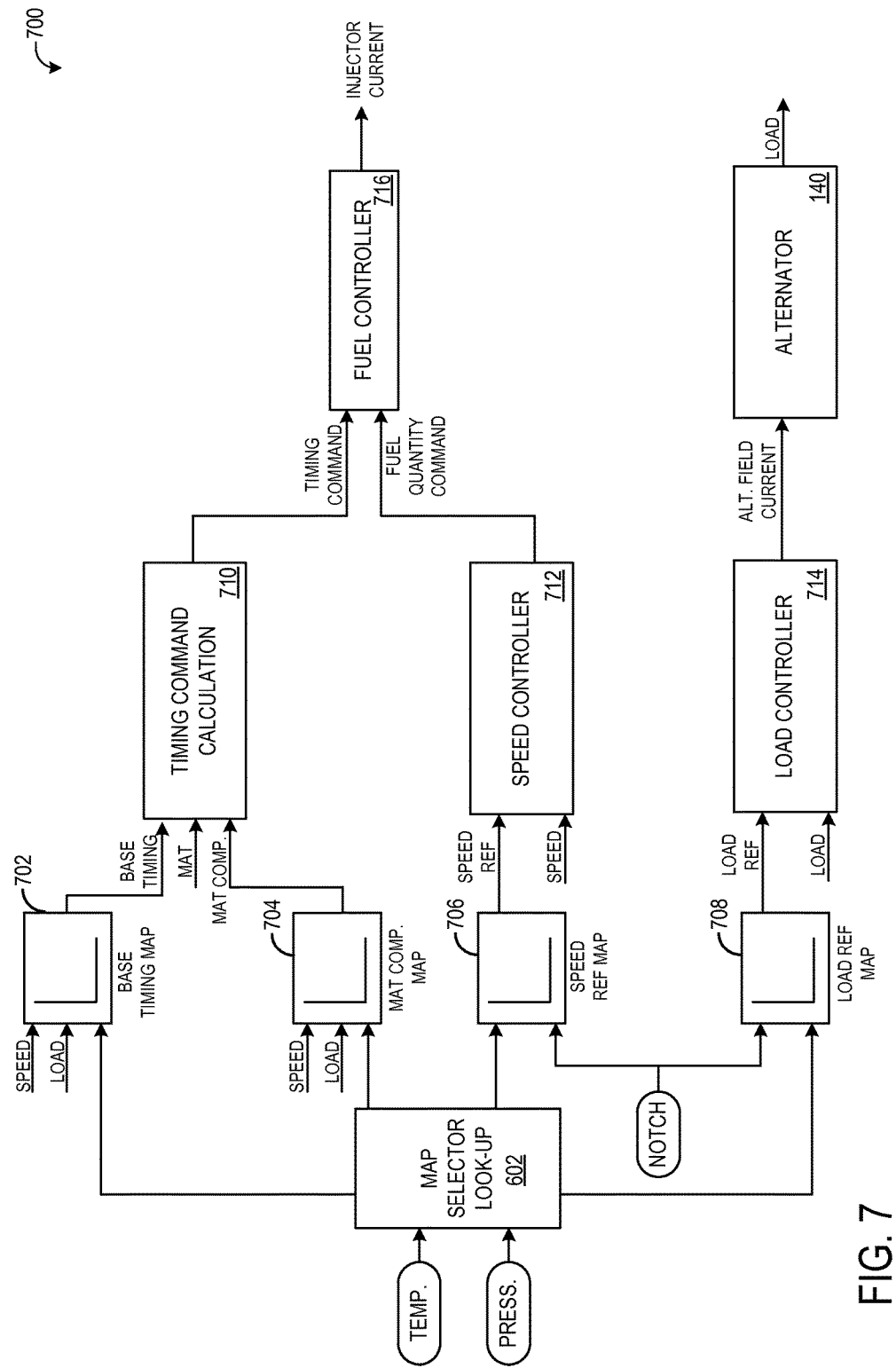

An embodiment of a system for an engine installed in a vehicle, including a controller, is illustrated in FIG. 1. The controller may be configured to carry out the methods illustrated in FIGS. 2-5 in order to adjust engine operating parameters, such as EGR amount and fuel injection, based on ambient conditions (e.g., ambient pressure and temperature). FIGS. 6A, 6B, and 7 illustrate control diagrams for adjusting EGR valve position and fuel injection, respectively, based on ambient conditions. In some embodiments, the EGR valve position may be further adjusted based on feedback from a NOx sensor.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for maintaining exhaust emissions within range, an example of a platform is disclosed in which the engine system may be installed in a vehicle, such as a rail vehicle. For example, FIG. 1 shows a block diagram of an embodiment of a vehicle system 100 (e.g., a locomotive system), herein depicted as a rail vehicle 106, configured to run on a rail 102 via a plurality of wheels 110. As depicted, the rail vehicle includes an engine 104. In other non-limiting embodiments, the engine may be a stationary engine, such as in a power-plant application, or an engine in a marine vessel or off-highway vehicle propulsion system as noted above.

The engine receives intake air for combustion from an intake, such as an intake manifold 115. The intake may be any suitable conduit or conduits through which gases flow to enter the engine. For example, the intake may include the intake manifold, the intake passage 114, and the like. The intake passage receives ambient air from an air filter (not shown) that filters air from outside of a vehicle in which the engine may be positioned. Exhaust gas resulting from combustion in the engine is supplied to an exhaust, such as exhaust passage 116. The exhaust may be any suitable conduit through which gases flow from the engine. For example, the exhaust may include an exhaust manifold, the exhaust passage, and the like. Exhaust gas flows through the exhaust passage, and out of an exhaust stack of the rail vehicle.

In one embodiment, the engine is a diesel engine that combusts air and diesel fuel through compression ignition. As such, the engine may include a plurality of fuel injectors to inject fuel to each cylinder of the engine. For example, each cylinder may include a direct injector that receives fuel from a high-pressure fuel rail. In other non-limiting embodiments, the engine may combust fuel including gasoline, kerosene, biodiesel, or other petroleum distillates of similar density through compression ignition (and/or spark ignition). In a still further example, the engine may combust gaseous fuel, such as natural gas. The gaseous fuel may be ignited via compression ignition of injected diesel fuel, herein referred to as multi-fuel operation, or the gaseous fuel may be ignited via spark ignition. The gaseous fuel may be supplied to the cylinders via one or more gas admission valves, for example. In further embodiments, the fuel may be supplied to the cylinders via port injection. The liquid fuel (e.g., diesel) may be stored in a fuel tank located on board the rail vehicle. The gaseous fuel may be stored in a storage tank located on board the rail vehicle or on board a different vehicle operably coupled to the rail vehicle.

In one embodiment, the rail vehicle is a diesel-electric vehicle (or diesel/gaseous fuel-electric hybrid). As depicted in FIG. 1, the engine is coupled to an electric power generation system, which includes an alternator/generator 140 and electric traction motors 112. For example, the engine generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to a plurality of traction motors and the alternator/generator may provide electrical power to the plurality of traction motors. As depicted, the plurality of traction motors are each connected to one of the plurality of wheels to provide tractive power to propel the rail vehicle. One example of a configuration includes one traction motor per wheel. As depicted herein, six pairs of traction motors correspond to each of six pairs of wheels of the rail vehicle. In another example, the alternator/generator may be coupled to one or more resistive grids 142. The resistive grids may be configured to dissipate excess engine torque via heat produced by the grids from electricity generated by alternator/generator.

In the embodiment depicted in FIG. 1, the engine is a V-12 engine having twelve cylinders. In other embodiments, the engine may be a V-6, V-8, V-10, V-16, I-4, I-6, I-8, opposed 4, or another engine type. As depicted, the engine includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 1, the non-donor cylinders are coupled to the exhaust passage to route exhaust gas from the engine to atmosphere (after it passes through an exhaust gas treatment system 130 and first and second turbochargers 120 and 124). The donor cylinders, which provide engine exhaust gas recirculation (EGR), are coupled exclusively to an EGR passage 162 of an EGR system 160 which routes exhaust gas from the donor cylinders to the intake passage of the engine, and not to atmosphere. By introducing cooled exhaust gas to the engine, the amount of available oxygen for combustion is decreased, thereby reducing combustion flame temperatures and reducing the formation of nitrogen oxides (e.g., $NO_x$).

Exhaust gas flowing from the donor cylinders to the intake passage passes through a heat exchanger such as an EGR cooler 166 to reduce a temperature of (e.g., cool) the exhaust gas before the exhaust gas returns to the intake passage. The EGR cooler may be an air-to-liquid heat exchanger, for example. In such an embodiment, one or more charge air coolers 132 and 134 disposed in the intake passage (e.g., upstream of where the recirculated exhaust gas enters) may be adjusted to further increase cooling of the charge air such that a mixture temperature of charge air and exhaust gas is maintained at a desired temperature. In other embodiments, the EGR system may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage rather than the intake passage.

Additionally, in some embodiments, the EGR system may include an EGR bypass passage 161 that is configured to divert exhaust from the donor cylinders back to the exhaust passage. The EGR bypass passage may be controlled via a valve 163. The valve may be configured with a plurality of restriction points such that a variable amount of exhaust is routed to the exhaust, in order to provide a variable amount of EGR to the intake.

In an alternate embodiment shown in FIG. 1, the donor cylinders may be coupled to an alternate EGR passage 165 (illustrated by the dashed lines) that is configured to selectively route exhaust to the intake or to the exhaust passage. For example, when a second valve 170 is open, exhaust may be routed from the donor cylinders to the EGR cooler and/or additional elements prior to being routed to the intake passage. Further, the alternate EGR system includes a first valve 164 disposed between the exhaust passage and the alternate EGR passage.

The first valve and second valve may be on/off valves controlled by the control unit 180 (for turning the flow of EGR on or off), or they may control a variable amount of EGR, for example. In some embodiments, the first valve may be actuated such that an EGR amount is reduced (exhaust gas flows from the EGR passage to the exhaust passage). In other embodiments, the first valve may be actuated such that the EGR amount is increased (e.g., exhaust gas flows from the exhaust passage to the EGR passage). In some embodiments, the alternate EGR system may include a plurality of EGR valves or other flow control elements to control the amount of EGR.

In such a configuration, the first valve is operable to route exhaust from the donor cylinders to the exhaust passage of the engine and the second valve is operable to route exhaust from the donor cylinders to the intake passage of the engine. As such, the first valve may be referred to as an EGR bypass valve, while the second valve may be referred to as an EGR metering valve. In the embodiment shown in FIG. 1, the first valve and the second valve may be engine oil, or hydraulically, actuated valves, for example, with a shuttle valve (not shown) to modulate the engine oil. In some embodiments, the valves may be actuated such that one of the first and second valves are normally open and the other is normally closed. In other embodiments, the first and second valves may be pneumatic valves, electric valves, or another suitable valve.

As shown in FIG. 1, the vehicle system further includes an EGR mixer 172 which mixes the recirculated exhaust gas with charge air such that the exhaust gas may be evenly distributed within the charge air and exhaust gas mixture. In the embodiment depicted in FIG. 1, the EGR system is a high-pressure EGR system which routes exhaust gas from a location upstream of turbochargers 120 and 124 in the exhaust passage to a location downstream of the turbochargers in the intake passage. In other embodiments, the vehicle system may additionally or alternatively include a low-pressure EGR system which routes exhaust gas from downstream of the turbochargers 1 in the exhaust passage to a location upstream of the turbochargers in the intake passage.

As depicted in FIG. 1, the vehicle system further includes a two-stage turbocharger with the first turbocharger 120 and the second turbocharger 124 arranged in series, each of the turbochargers arranged between the intake passage and the exhaust passage. The two-stage turbocharger increases air charge of ambient air drawn into the intake passage in order to provide greater charge density during combustion to increase power output and/or engine-operating efficiency. The first turbocharger operates at a relatively lower pressure, and includes a first turbine 121 which drives a first compressor 122. The first turbine and the first compressor are mechanically coupled via a first shaft 123. The first turbocharger may be referred to the "low-pressure stage" of the turbocharger. The second turbocharger operates at a relatively higher pressure, and includes a second turbine 125 which drives a second compressor 126. The second turbocharger may be referred to the "high-pressure stage" of the turbocharger. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one embodiment, three turbochargers are used in series. In another embodiment, only two turbochargers are used in series.

In the embodiment shown in FIG. 1, the second turbocharger is provided with a turbine bypass valve 128 which allows exhaust gas to bypass the second turbocharger. The turbine bypass valve may be opened, for example, to divert the exhaust gas flow away from the second turbine. In this manner, the rotating speed of the compressor, and thus the boost provided by the turbochargers to the engine may be regulated during steady state conditions. Additionally, the first turbocharger may also be provided with a turbine bypass valve. In other embodiments, only the first turbocharger may be provided with a turbine bypass valve, or only the second turbocharger may be provided with a turbine bypass valve. Additionally, the second turbocharger may be provided with a compressor bypass valve 129, which allows gas to bypass the second compressor to avoid compressor surge, for example. In some embodiments, first turbocharger may also be provided with a compressor bypass valve, while in other embodiments, only first turbocharger may be provided with a compressor bypass valve. Further, in some embodiments one or both of the turbines of the first and second turbochargers may be variable geometry turbines.

The vehicle system further includes an exhaust treatment system 130 coupled in the exhaust passage in order to reduce regulated emissions. As depicted in FIG. 1, the exhaust gas treatment system is disposed downstream of the turbine of the first (low pressure) turbocharger. In other embodiments, an exhaust gas treatment system may be additionally or alternatively disposed upstream of the first turbocharger. The exhaust gas treatment system may include one or more components. For example, the exhaust gas treatment system may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof. In some embodiments, the exhaust treatment system may be omitted.

The vehicle system further includes the control unit 180 (also referred to as a controller), which is provided and configured to control various components related to the vehicle system. In one embodiment, the control unit includes a computer control system. The control unit further includes non-transitory, computer readable storage media (not shown) including code for enabling on-board monitoring and control of engine operation. The control unit, while overseeing control and management of the vehicle system, may be configured to receive signals from a variety of engine sensors, as further elaborated herein, in order to determine operating parameters and operating conditions, and correspondingly adjust various engine actuators to control operation of the vehicle system. For example, the control unit may receive signals from various engine sensors including sensor 181 arranged in the inlet of the high-pressure turbine, sensor 182 arranged in the inlet of the low-pressure turbine, sensor 183 arranged in the inlet of the low-pressure compressor, and sensor 184 arranged in the inlet of the high-pressure compressor. The sensors arranged in the inlets of the turbochargers may detect air temperature and/or pressure. Additional sensors may include, but are not limited to, engine speed, engine load, boost pressure, ambient pressure, exhaust temperature, exhaust pressure, etc. Further, the control unit may receive signals from intake sensor 185, which may include one or more sensors for measuring intake manifold pressure, intake manifold pressure, or other parameters, exhaust sensor 186, which may include one or more sensors for measuring exhaust oxygen, exhaust NOx, exhaust particulate matter, or other parameters, and ambient sensor 187, which may include one or more sensors for measuring ambient temperature, ambient pressure, ambient humidity (specific and/or relative), or other parameters. As used herein, ambient may refer to conditions of the air external to the engine system, which may include air outside the vehicle, air inside the vehicle, and/or air that is inducted into the engine. Correspondingly, the control unit may control the vehicle system by sending commands to various components such as traction motors, alternator, cylinder valves, throttle, heat exchangers, wastegates or other valves or flow control elements, etc.

The vehicle system may be configured to maintain engine out emissions below regulated limits over a wide range of ambient conditions, while providing optimum fuel efficiency. The ambient conditions, namely ambient temperature and pressure, can effect numerous engine parameters that ultimately impact emissions. As a first example, turbocharger air flow may be impacted by ambient pressure and temperature, which may affect the flow rate, density, or other parameters of the air flow. The turbocharger air flow impacts air-fuel ratio, which in turn impacts PM production. For example, as air-fuel ratio increases, PM production decreases. Turbocharger air flow also impacts intake manifold oxygen concentration in an engine having EGR, which in turn impacts both PM and NOx production. For example, as the oxygen concentration increases, NOx production increases while PM production decreases. In a second example, an intercooler heat rejection may be affected by ambient temperature and pressure, which may affect the temperature differential between the intercooler and intake air. The heat rejection impacts the intake manifold air temperature, which in turn impacts both NOx and PM emissions. For example, as manifold air temperature increases, NOx increases while PM decreases.

As can be appreciated from the above examples, balancing NOx and PM emissions across a variety of ambient conditions may be difficult, as a change in ambient conditions may cause one emission to increase while causing the other emission to decrease. Further, if adjustments are made to engine operating parameters (such as EGR flow) to maintain desired emissions, fuel economy may be impacted in some examples.

Thus, according to embodiments disclosed herein, a series of adjustments based on ambient conditions may be made, starting from a first, "coarse" adjustment down to a final, "fine" adjustment, to maintain emissions within range while providing desired fuel economy. The first adjustment may include selecting one or more reference value maps from a plurality of possible maps, based on ambient conditions, in order to account for the impact of the ambient conditions on air flow and heat rejection. The values output from the maps may be in turn input into a variety of respective calculations and/or controllers ultimately used to adjust engine operation. A second adjustment may include adjusting an intake manifold oxygen concentration target and injection timing based on intake manifold temperature, to account for the impact of the ambient conditions on intercooler heat rejection. As used herein, "intake manifold oxygen concentration" may include a concentration value (based on weight or volume of the intake air, for example), or may include a percentage of the intake air volume or weight. As such, the intake manifold oxygen concentration may also be referred to as an intake oxygen fraction.

A third adjustment may include controlling exhaust valve position, such as one or more EGR valves, based on an intake fresh air or EGR fraction determined from the target intake manifold oxygen concentration. For the above three adjustments, control of injection timing and exhaust valve position may be based on sensor data, including exhaust oxygen concentration, measured EGR valve position, and other data.

The adjustments described above may reasonably control emissions during a wide variety of ambient conditions. As mentioned above, EGR valve position may be controlled to reach the target intake fresh air fraction. However, at least in some embodiments, both EGR valve position and intake oxygen concentration are determined based on models, which may introduce error to the adjustments. Further, the relationship between NOx emissions and intake manifold oxygen concentration may be variable. Reducing the sources of error and variation may be important for meeting the desired emissions targets.

Thus, to reduce the above described sources of error and variation, a fourth adjustment may be performed. The fourth adjustment may include adjusting the intake oxygen concentration target based on feedback from a NOx sensor. By directly inputting sensed NOx, the variation between intake oxygen concentration and NOx may be reduced. However, as NOx levels in the exhaust may be impacted by other parameters, a brake specific NOx (BSNOx) may be used, where the sensed NOx is corrected for exhaust oxygen concentration and other parameters. As used herein, BSNOx refers to an exhaust NOx concentration that is normalized to engine output (e.g., engine power represented by horsepower). In this way, the disclosure controls on what is actually limited by the regulation (e.g., corrected brake specific NOx). In some embodiments, the sensed NOx may additionally or alternatively be corrected based on humidity.

Figure 2:
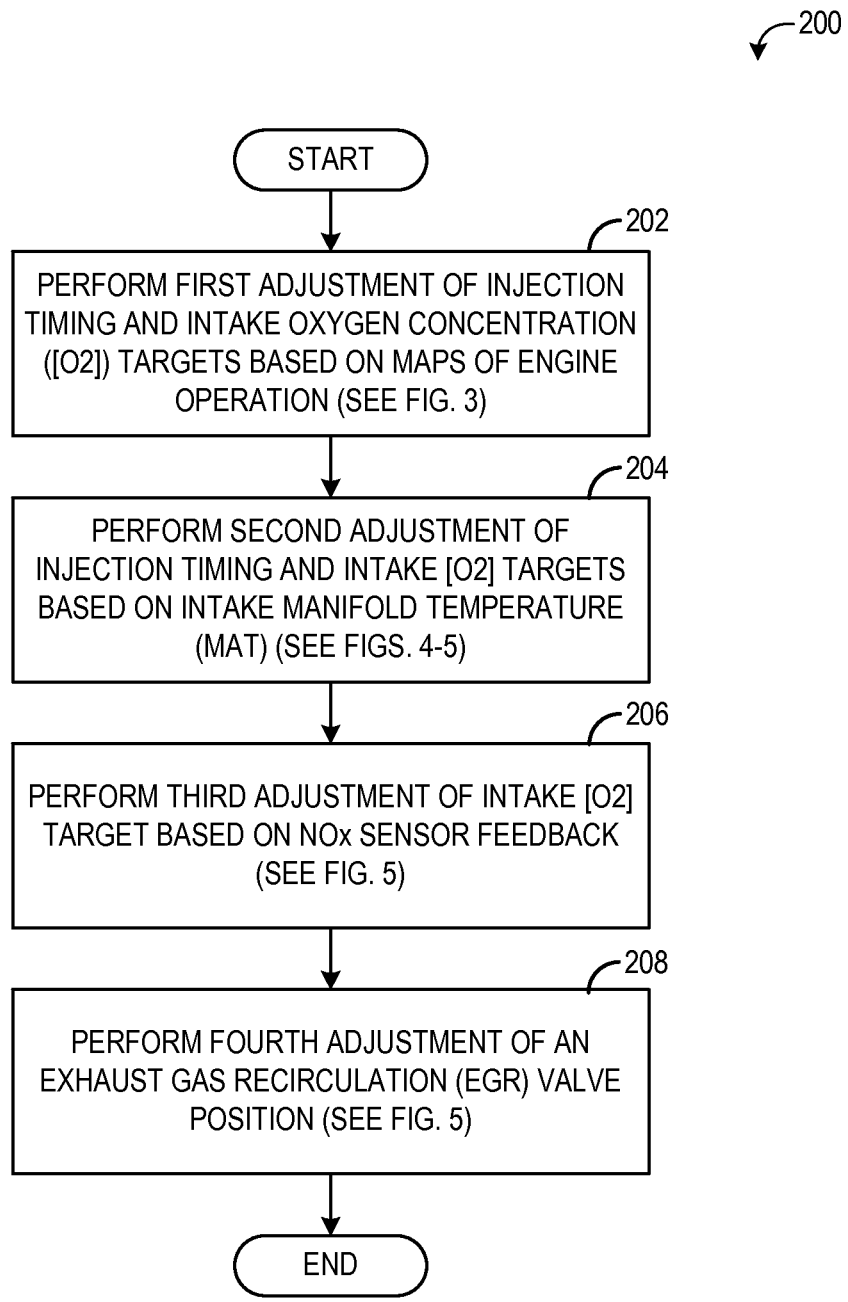
FIG. 2 is a high-level flow chart illustrating a plurality of adjustments for engine operating parameter based on ambient conditions.

Turning now to FIG. 2, a high-level method 200 for controlling emissions is illustrated. Method 200 may be carried out by a controller, such as control unit 180, according to instructions stored thereon. At 202, method 200 includes performing a first adjustment of injection timing and intake oxygen concentration ([O2]) targets based on maps of engine operation. The first adjustment will be explained in more detail below with respect to FIG. 3. Briefly, the adjustment includes inputting ambient conditions, such as temperature and pressure, into a map selector look-up that selects a plurality of engine operation maps based on the ambient conditions. The maps may include reference or target values for intake oxygen concentration, fuel injection timing, speed, load, etc. Engine operation, including fuel injection quantity, fuel injection timing, exhaust valve position, etc., may then be controlled to meet the target values.

At 204, method 200 includes performing a second adjustment of injection timing and intake [O2] targets based on intake manifold temperature (MAT). The second adjustment includes respective MAT compensation factors, output from respective maps selected according to ambient conditions, used to further adjust the target injection timing and intake [O2] targets. The second adjustment is explained in more detail below with respect to FIGS. 4-5. At 206, method 200 includes performing a third adjustment of the intake [O2] target based on NOx sensor feedback, as will be explained in more detail below with respect to FIG. 5. Briefly, feedback from a NOx sensor may be used to fine-tune the target intake [O2] to reduce variation and error. At 208, a fourth adjustment of an EGR valve position is performed, as will be explained in more detail below with respect to FIG. 5. This fourth adjustment includes converting the target intake [O2] to a reference intake fresh air fraction or reference EGR fraction, where the exhaust valve position adjustment made to reach the target EGR or fresh air fraction is based at least in part on fresh air fraction or EGR fraction feedback. Method 200 then ends.

Thus, method 200 of FIG. 2 includes a series of adjustments, explained in detail below, that may be performed in order to ultimately control fuel injection timing and EGR valve position to meet fuel injection and intake oxygen concentration targets. In doing so, emissions, particularly PM and NOx, may be maintained within regulated limits. In some embodiments, all four adjustments may be performed, while in other embodiments, only a portion of the adjustments may be performed. For example, the third adjustment may be performed based on engine operating state. This may include, under some conditions, such as during a cold start, transient operation, or other conditions where feedback from the NOx sensor may be unreliable, dispensing with the third adjustment.

In this way, a series of adjustments from coarse to fine may applied to control injection timing and intake oxygen concentration. The first, most coarse adjustment may have the largest magnitude of impact on the EGR valve position and hence EGR flow, while the fourth, finest adjustment may have the smallest magnitude of impact on the EGR valve position and hence flow. In some embodiments, the coarse to fine adjustment may enable fast response rates to changes in operating conditions that would otherwise be too coarse (although fast) or too slow (but exacting). To achieve the balance between fast response rates and accuracy, a lower gain and a larger filter may be applied to the third adjustment than to the second adjustment of the intake oxygen concentration target, in some embodiments.

Figure 3:
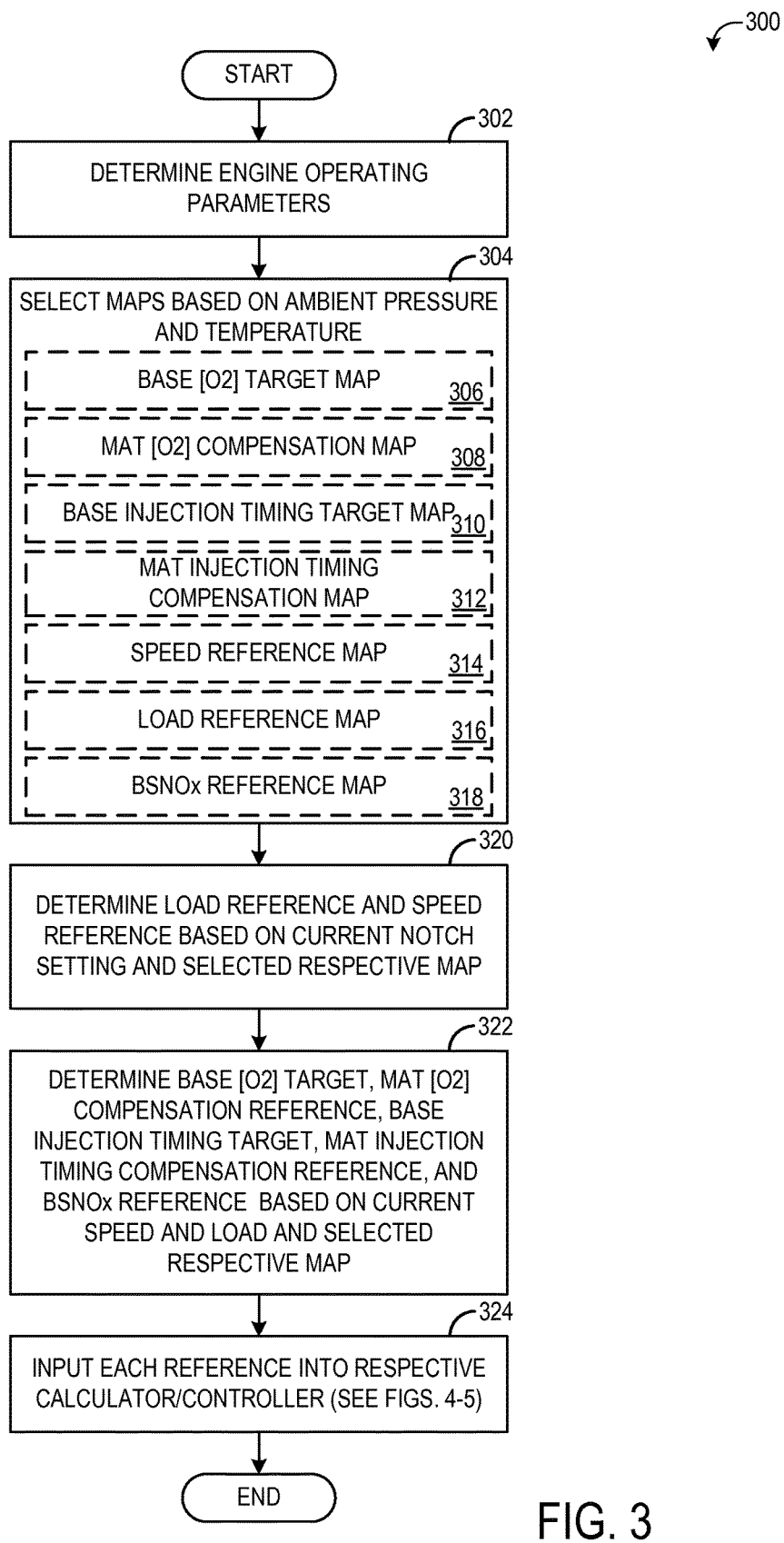
FIG. 3 is a flow chart illustrating an embodiment of a method for determining a plurality of reference engine operation parameter values based on ambient conditions.

FIG. 3 is a flow chart illustrating a method 300 for performing the first adjustment of method 200. At 302, method 300 includes determining engine operating parameters. The determine engine operating parameters may include, but are not limited to, ambient pressure, temperature, and humidity (determined from ambient sensor 187 of FIG. 1, for example), exhaust oxygen and/or NOx concentration (determined from exhaust sensor 186, for example), intake manifold pressure and/or temperature (determined from intake sensor 185, for example), engine speed, engine load, notch or other throttle setting, and/or other parameters.

At 304, method 300 includes selecting one or more maps based on ambient pressure and ambient temperature. The maps may include engine speed and load reference as a function of notch, fuel injection timing target and intake [O2] target as a function of speed and load, and/or other maps. The map output provides references that result in optimum fuel efficiency while meeting emissions targets within the ambient range of that map. Examples of map selections could include, for each reference map, a base map, a cold ambient map, a hot ambient map, and a high altitude map.

The selected maps may include a base [O2] target map 306, a MAT [O2] compensation map 308, a base injection timing target map 310, a MAT injection timing compensation map 312, a speed reference map 314, a load reference map 316, and a BSNOx reference map 318. However, additional and/or alternative maps may be possible.

At 320, a load reference and speed reference may be determined based on the current notch setting and selected respective maps (e.g., speed reference map 314 and load reference map 316). In this way, the engine may be controlled to reach target speed and load based on ambient conditions and further based on current throttle setting.

At 322, a base [O2] target, MAT [O2] compensation reference, base injection timing target, MAT injection timing compensation reference, and BSNOx reference may be determined based on current engine speed and load and the selected respective map (e.g., base [O2] target map 306, MAT [O2] compensation map 308, base injection timing target map 310, MAT injection timing compensation map 312, and BSNOx reference map 318).

At 324, each reference or target value output from the selected maps in input into respective calculators and/or controllers to control engine operation to meet emission targets, as will be explained below with respect to FIGS. 4-5.

Figure 4:
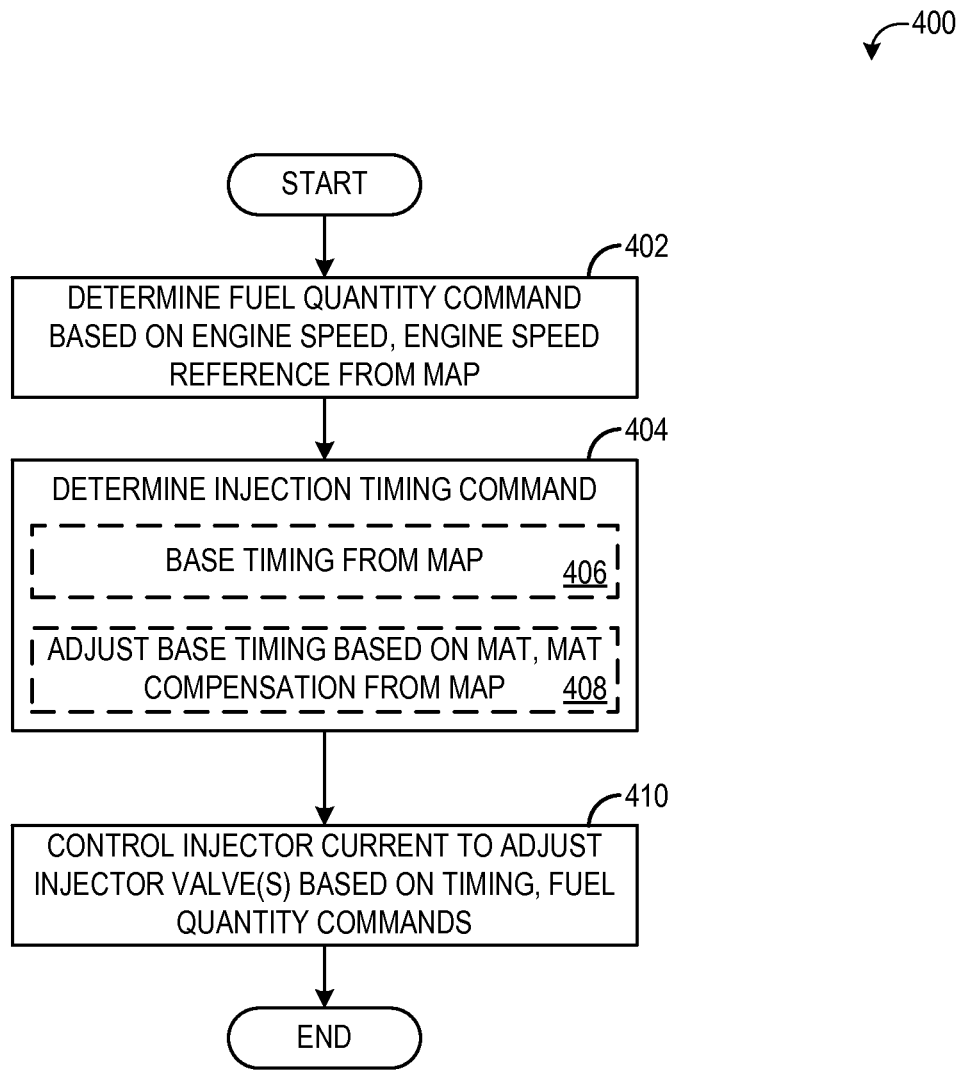
FIG. 4 is a flow chart illustrating an embodiment of a method for adjusting fuel injection based on ambient conditions.

FIG. 4 is a method 400 controlling injection timing. Method 400 includes the second adjustment of method 200. Further, method 400 utilizes maps selected according to method 300. At 402, method 400 includes determining a fuel quantity command based on engine speed and the engine speed reference output from the engine speed reference map 314 described above. At 404, a fuel injection timing command is determined. The fuel injection timing command is determined according to a base timing target output from injection timing target map 310, as indicated at 406. The timing target is adjusted based on MAT and based on the output of the MAT injection timing compensation map 312, as indicated at 408. At 410, the fuel injector current is controlled to adjust the fuel injector valve(s) based on the fuel injection timing and fuel quantity commands determined above. Method 400 then ends.

Thus, as explained above, fuel injection parameters may be adjusted based on ambient conditions. This may include a first adjustment, described above with respect to FIG. 3, where a base fuel injection timing map, as well as a MAT compensation map, are selected based on ambient conditions, such as temperature and pressure. The selected base injection timing map outputs a fuel injection timing target as a function of engine speed and load. The fuel injection timing target is then subject to a second adjustment based on MAT, where the target is adjusted based on a compensation factor output by the MAT compensation map as a function of MAT. The fuel injector(s) are controlled to meet the target fuel injection timing, as well as controlled to meet the fuel quantity command.

Figure 5:
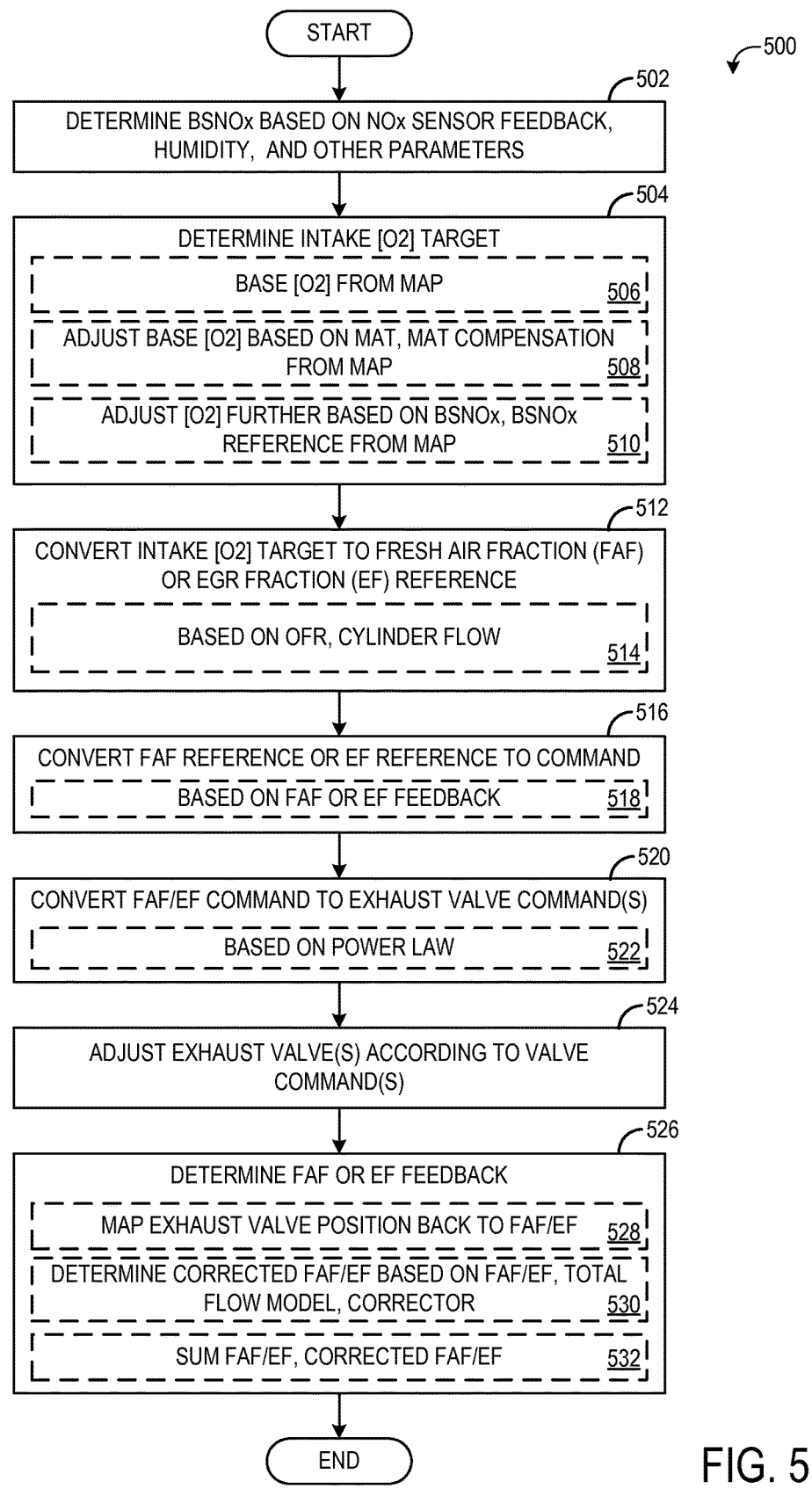
FIG. 5 is a flow chart illustrating an embodiment of a method for adjusting an exhaust valve position based on ambient conditions.

FIG. 5 is a method 500 for controlling a position of one or more exhaust valves to meet a target intake [O2]. Method 500 includes the second, third, and fourth adjustments of method 200. Further, method 500 utilizes maps selected according to method 300. At 502, method 500 includes determining BSNOx based on NOx sensor feedback, humidity, and/or other parameters. In one embodiment, the other parameters may include exhaust oxygen sensor output, engine power, and fuel flow. The engine power and fuel flow may be modelled or sensed. In another embodiment, the other parameters may include measured fresh air flow or measured EGR flow and a cylinder flow model in place of the fuel flow and exhaust [O2]. The selection of which parameters are used to determine the BSNOx may depend on the sensor configuration of the engine.

At 504, an intake [O2] target is determined. Determining the intake [O2] target includes determining an intake [O2] target according to a base intake [O2] target output from intake [O2] target map 306, as indicated at 506, which as explained above may be based on engine speed and/or load. In one embodiment, engine load may be determined based on throttle position (e.g., notch throttle position). The base intake [O2] target may be adjusted based on MAT and a MAT compensation factor output from map 306, as indicated at 508. The intake [O2] target may be adjusted further at 510 based on BSNOx and the BSNOx reference output from map 318.

At 512, the intake [O2] target is converted to either an intake fresh air fraction (FAF) reference or an EGR fraction (EF) reference. The fresh air fraction represents the fraction of the total intake gas flow to the intake manifold that is comprised of fresh air, while the EGR fraction represents the fraction of the total intake gas flow to the intake manifold that is comprised of EGR. The fresh intake air flow may refer to intake air flow that excludes EGR, including ambient air from outside the engine that may or may not be filtered. In some embodiments, the fresh intake air may include air other than ambient air, such as purge air or other gas sources, while still excluding EGR. The overall or total intake gas flow refers to all the air that is inducted into the cylinders, and includes the fresh air and EGR. The FAF reference or EF reference is then used to control exhaust valve position, as described below. By utilizing a fraction-based exhaust valve position control, rather than a flow based control, for example, the controller input-output may be linearized, gain scheduling may be reduced, and boost impact may be minimized, reducing controller complexity and increasing the efficiency of the controller.

The intake [O2] target may be converted to either the FAF reference or the EF reference based on an oxygen-fuel ratio (OFR) setpoint, cylinder flow (both donor and non-donor cylinder flow), and/or other parameters, as indicated at 514.

At 516, method 500 includes converting the FAF reference or the EF reference to either a FAF command or an EF command, respectively. As indicated at 518, the fraction reference may be converted to the respective command based on a FAF feedback value or an EF feedback value. Additional details regarding how the FAF feedback or EF feedback values are determined will be presented below at 526 of method 500. Briefly, the fraction feedback values are based on measured exhaust valve position, which is mapped back to either fresh air fraction or EGR fraction, and then corrected utilizing a predictor/corrector model for intake manifold flow. In one embodiment, the FAF command may be determined based on an error between the FAF reference and the FAF feedback value, and the EF command may be determined based on error between the EF reference and the EF feedback value.

At 520, the FAF command or the EF command is converted to one or more exhaust valve commands. In one embodiment, the one or more exhaust valves may include one or more EGR valves, such as the first valve 164 (referred to as the EGR bypass valve) and second valve 170 (referred to as the EGR metering valve). In other embodiments, the one or more exhaust valves may include additional or alternative valves, such as the turbine bypass valve described above.

The FAF command or EF command may be converted into an exhaust valve command according to a power law function, as indicated at 522. This may include inputting the FAF command or EF command into a respective look-up table that outputs a given exhaust valve command as a function of the FAF or EF command. Each respective look-up table may be populated according to data collected during engine operation. For example, a predictor table may output the fresh air fraction as a function of exhaust valve position and manifold pressure. Using the inverse of the predictor table allows for predicting the valve position as a function of desired air flow fraction.

As explained above, the exhaust system may include two EGR valves, a metering valve and a bypass valve that may be controlled in tandem. The look-up table (e.g., the inverse predictor table described above) may output a single value based on the fresh air fraction (and manifold pressure and/or total cylinder flow in some embodiments), referred to as the pseudoarea, which may represent the percentage of the EGR passage that is to be open (e.g., unrestricted) to deliver the EGR for reaching the desired fresh air fraction. However, because the flow through the EGR passage is controlled by two valves, this pseudoarea may be converted into respective effective areas for each EGR valve according to a power law function. The power law function may output an effective area value for one EGR valve (e.g., the metering valve) based on the pseudoarea, and then based the effective area of the metering valve, output an effective area of the bypass valve. The effective area for each valve can then be converted to a valve percentage, then to a degree of opening, and then to an amount of current to produce that degree of opening.

At 524, method 500 includes adjusting the exhaust valve (s), such as the EGR metering valve and the EGR bypass valve, according to the exhaust valve command(s) determined at 520.

As explained above, the FAF or EF references may be converted to a respective command based on FAF or EF feedback. Thus, at 526, method 500 includes determining FAF or EF feedback. This includes, at 528, mapping the exhaust valve position back to FAF or EF. As explained above, the predictor table may be used to output a FAF value or EF value based on measured exhaust valve position. The FAF or EF value from the predictor table is used along with total flow model output and corrector output (explained in more detail below) to determine a corrected FAF or EF, as indicated at 530. The corrected FAF or EF is summed with the FAF or EF output from the predictor table to reach the FAF or EF feedback value, as indicated at 532.

In one embodiment, the total flow model output used to determine the corrected FAF or EF may include a volumetric efficiency model, where the volumetric efficiency of the engine (based on intake manifold conditions) coupled with engine speed describes the total air flow into the cylinders. Briefly, the volumetric efficiency of an engine is the ratio of actual air flow into the cylinders to the theoretical maximum air flow possible (based on the known hardware configuration of the engine, e.g., the displacement of the engine). The volumetric efficiency may be determined based on engine speed, exhaust pressure, manifold air pressure, and manifold air temperature, and may provide an accurate estimation of intake air flow during both transient and steady state conditions. In an embodiment, the corrector output may comprise output from an air-fuel ratio model used to estimate fresh intake air flow based on air-fuel ratio (AFR) and fuel flow. The AFR may be determined based on feedback from an exhaust oxygen sensor (and further based on sensed or estimated humidity in some embodiments), and the fuel flow may be determined from fuel injector maps and assumption or modeling of fuel density.

In order to determine the corrected FAF or EF, an error between the FAF or EF output from the predictor table and the FAF or EF output from the corrector may be determined. Further, in some embodiments, the total flow model output may be used as an input to the predictor table in addition to the MAT and exhaust valve position(s).

FIGS. 6A, 6B, and 7 are a series of control diagrams that graphically illustrate the methods of FIGS. 2-5. Specifically, FIGS. 6A and 6B illustrate a first control diagram 600 directed to controlling exhaust valve position and FIG. 7 illustrates a second control diagram 700 directed to controlling fuel injection parameters. While the control sequence is separated into discrete diagrams, it is to be understood that both controls could be performed simultaneously, and that some of the same control blocks, inputs, and outputs are present in both control diagrams. In one embodiment, separate control diagrams are presented merely for clarity of illustration.

First control diagram 600 of FIGS. 6A and 6B includes a map selector look-up 602 that selects one or more maps from a plurality of possible maps based on ambient temperature and pressure. In the diagram 600, the map selector look-up selects an appropriate base intake [O2] target map 604, an appropriate MAT compensation map 608, and an appropriate BSNOx reference map 610 based on ambient temperature and pressure. The base intake [O2] target map outputs a base [O2] target as a function of speed and load (where speed and load are understood to be engine speed and load that are modelled and/or sensed). Likewise, the MAT compensation map outputs a compensation factor based on speed and load. Both the base [O2] target and MAT compensation factor are input into an [O2] reference calculation block 612 along with measured MAT.

The BSNOx reference map outputs a reference BSNOx as a function of speed and load. The reference BSNOx is fed into a BSNOx [O2] adjustment calculation block 614 along with determined BSNOx. The BSNOx O2 adjustment calculation block outputs a BSNOx adjustment to the [O2] reference calculation block, which will be described in more detail below.

Returning to the actual BSNOx, it is determined at the BSNOx calculation block 622. As illustrated, the BSNOx calculation block calculates BSNOx based on speed, load, NOx (e.g., NOx ppm as sensed from a NOx sensor), humidity (e.g., specific humidity determined from an ambient humidity sensor), exhaust [O2], and fuel quantity command. The fuel quantity command determination will explained below with respect to FIG. 7. In some embodiments, the BSNOx may be calculated without using humidity as an input.

The [O2] reference calculation block performs a series of adjustments on the base [O2] target output by the base intake [O2] target map. One adjustment includes an adjustment based on MAT, according to measured MAT and the output MAT compensation factor. Another adjustment includes an adjustment based on BSNOx according to the BSNOx adjustment factor output by the BSNOx [O2] adjustment calculation block. The O2 reference calculation block outputs a reference (also referred to as target) intake [O2]. This reference is then adjusted based on the BSNOx O2 adjustment output from the BSNOx O2 adjustment calculation block 614. For example, as shown the output from block 612 is added to the output from block 614 to arrive at the O2 reference.

The control diagram 600 continues on FIG. 6B, where the O2 reference is input into an O2 reference conversion block 630. As explained above, the O2 reference conversion block converts the intake [O2] reference to either a fresh air fraction (FAF) reference or an EGR fraction reference based on an oxygen-fuel ratio (OFR) setpoint, cylinder flow (both donor and non-donor cylinder flow), and/or other parameters. The control diagram of FIGS. 6A and 6B illustrates an example where only the FAF reference is utilized; however, it is to be understood that the EGR fraction reference could be used, or both could be used, in order to control EGR valve position.

The FAF reference is input into an FAF regulator block 632 that outputs an FAF command based on FAF feedback, which represents the sum of the output of FAF table block 638 and air handling model block 640, which will be explained in more detail below. In one embodiment, the FAF regulator may determine an error between the FAF reference and FAF feedback and adjust the error based on a desired gain and/or filter to generate an FAF command. The FAF command is output into an EGR valve command block 634.

The EGR valve command block 634 outputs a metering valve command (MV_Cmd) and a bypass valve command (BPV_Cmd) based on the FAF command. As explained above with respect to FIG. 5, the FAF command may be used to determine the EGR valve commands using the inverse of the FAF table 638 and a power law function. Further, in some embodiments, a position limit may be applied to the EGR valves. For example, a limit may be placed on the metering valve position command as a function of the bypass valve's actual position and vice versa. This insures that a minimum total flow area is available between the two EGR valves and prevents excessive pressure in the EGR (or donor) manifold in the event of degradation of one of the EGR valves.

The EGR valve commands are entered into EGR valve position plant 636, which outputs the actual MV and BPV positions. For example, the MV_Cmd and BPV_Cmd may be commands sent from the controller to the actuators of the metering valve and bypass valve. The respective positions of the metering valve and bypass valve may be measured (e.g., by valve positon sensors) and input into the FAF table 638, which outputs an FAF value. In some embodiments, MAT and/or cylinder flow may also be entered as inputs to the FAF table.

The FAF output from the FAF table is input into the air handling model block 640. Additionally, output from a total flow model block 642 and corrector block 644 are also entered into the air handling model block 640. As explained above, the total flow model may determine total intake manifold air flow using a volumetric efficiency model that calculates total flow based on sensor output, including engine speed, exhaust pressure, manifold air pressure, and manifold air temperature. The corrector block determines intake manifold fresh air flow based on sensor outputs including air-fuel ratio (AFR) and fuel flow. The corrected FAF output from the air handling model block 640 is summed with the FAF output from the FAF table 638 and provided as feedback to the FAF regulator 632. The corrector FAF is determined by dividing the corrector flow by the total flow. An error term is determined by subtracting the predictor FAF (output of the FAF table) from the corrector FAF. A typical or slow correction is determined by applying a low pass filter to the error term. The slow correction is added to the predictor FAF (output of the FAF table) to create the final FAF feedback.

Second control diagram 700 of FIG. 7 includes the map selector look-up 602 that selects one or more maps from a plurality of possible maps based on ambient temperature and pressure. In the diagram 700, the map selector look-up selects a base injection timing target map 702, a MAT compensation map 704 (specific to adjusting fuel injection timing, and thus separate and distinct from the MAT compensation map 608 of diagram 600), a speed reference map 706, and a load reference map 708.

The base injection timing target map outputs a base injection timing target as a function of speed and load (where speed and load are understood to be engine speed and load that are modelled and/or sensed). Likewise, the MAT compensation map 704 outputs a compensation factor based on speed and load. Both the base injection timing target and MAT compensation factor are input into a timing command calculation block 710 along with measured MAT. The timing command calculation block outputs a timing command to a fuel controller 716.

The fuel controller receives the timing command along with a fuel quantity command output by speed controller 712. The fuel controller controls the fuel injector current to deliver the commanded fuel quantity at the commanded timing. The speed controller determines the fuel quantity command based on the difference between measured engine speed and a speed reference (along with any indicated applied gains and/or filters). The speed reference is determined from the output of speed reference map, which outputs the speed reference as a function of notch or other throttle setting.

Additionally, the map selector look-up outputs a load reference map that outputs a load reference as a function of notch or other throttle setting. The load reference is input into a load controller 714 along with measured load. The load controller outputs an alternator field current based on the difference between the measured and reference load, and adjusts the load on the alternator 140 to reach the reference load.

In this way, a plurality of reference values may be determined based on respective maps that are each selected as a function of ambient conditions. The reference values may be used in a variety of calculation blocks and/or input into controllers to ultimately control various engine operating parameters, including exhaust valve position (to control EGR flow and hence intake oxygen concentration), fuel injection timing and quantity, engine speed, and engine load. As explained previously, the intake oxygen concentration, fuel injection timing and quantity, engine speed, and engine load each differentially impact emissions and fuel efficiency. By adjusting each engine operating parameter based at least in part on ambient conditions, exhaust emissions (including PM and NOx) may be maintained within target ranges without comprising fuel efficiency. Additionally, by including exhaust sensor feedback from a NOx and/or oxygen sensor, real-time, closed loop control may be provided to reduce error and variation, further improving emission control.

In some embodiments, the closed-loop BSNOx control may be utilized at steady state speed and load under loaded conditions only. The output of the BSNOx loop may be held (e.g., remembered) or reset to zero when the loop is disabled. Because the BSNOx approaches infinity as brake power approaches zero, the BSNOx loop may not be useful during low load conditions. In some embodiments, a NOx ppm control loop may be implemented at low loads, such as idle, or an indicated specific NOx control loop may be used at low loads. Further, during transient conditions the NOx control may be disabled due to variations in the relationship between the intake oxygen concentration and BSNOx.

An embodiment relates to a system for an engine, including a controller configured to respond to a sensed or estimated intake oxygen fraction by controlling an exhaust gas recirculation (EGR) amount supplied to the engine to maintain a level of particulate matter (PM) in a determined PM range and a level of NOx in a determined NOx range. The controller is further configured to adjust a target intake manifold oxygen fraction or target intake manifold EGR fraction in response to a NOx sensor feedback signal. In an embodiment, the controller is configured to, after adjusting the target intake manifold oxygen fraction in response to the NOx sensor feedback signal, convert the target intake manifold oxygen fraction to a target fresh air fraction and change the EGR amount based on a difference between the target fresh air fraction and a fresh air fraction feedback value. In an embodiment, the controller is configured to determine the fresh air fraction feedback value based on a measured EGR valve position, an intake manifold volumetric efficiency model, and an air-fuel ratio-based fresh air fraction estimation. In an embodiment, the controller is configured to, after adjusting the target intake manifold EGR fraction in response to the NOx sensor feedback signal, control the EGR amount based on a difference between the target EGR fraction and an EGR fraction feedback value. In an embodiment, the controller is configured to determine the EGR fraction feedback value based on a measured EGR valve position, an intake manifold volumetric efficiency model, and an air-fuel ratio-based EGR fraction estimation. In an embodiment, the controller is further configured to adjust fuel injection timing to maintain the level of PM within the determined PM range, the fuel injection timing determined based on a reference injection timing output from a map and adjusted based on intake manifold temperature, the map selected from among a plurality of maps based on ambient temperature and pressure.

Another embodiment of a system includes an engine having an intake manifold and a plurality of cylinders; an exhaust gas recirculation (EGR) passage configured to flow EGR from at least a subset of the plurality of cylinders to the intake manifold; and a controller configured to adjust a position of an EGR valve based on a target intake fresh air fraction, the target intake fresh air fraction determined based on a reference intake oxygen concentration and a corrected exhaust NOx concentration. In an embodiment, the reference intake oxygen fraction is determined based on a map selected from among a plurality of maps based on one or more throttle positions, ambient temperature, and ambient pressure. In an embodiment, the corrected exhaust NOx concentration is sensed from an exhaust NOx sensor and corrected based on exhaust oxygen concentration, engine speed, engine load, and fuel injection quantity. In an embodiment, the corrected exhaust NOx concentration is further corrected based on humidity. In an embodiment, the controller is further configured to adjust the target intake fresh air fraction based on a current EGR valve position and a corrected intake fresh air fraction. In an embodiment, the corrected intake fresh air fraction is determined based on one or more of the current EGR valve position, an intake manifold volumetric efficiency model, and an air-fuel ratio based intake fresh air fraction estimation. In an embodiment, in order to determine the target intake fresh air fraction based on the reference intake oxygen fraction and the corrected exhaust NOx concentration, the controller is configured to adjust the reference intake oxygen fraction based on the corrected exhaust NOx concentration and convert the adjusted reference intake oxygen fraction to the target intake fresh air fraction based on an oxygen-fuel ratio setpoint and cylinder air flow. In an embodiment, the plurality of cylinders includes a donor cylinder group and a non-donor cylinder group, the donor cylinder group coupled to the EGR passage and the non-donor cylinder group coupled to an exhaust passage, wherein the EGR valve is positioned in the EGR passage. In an embodiment, the EGR valve is a first EGR valve, and further comprising a second EGR valve positioned in a passage coupled between the EGR passage and the exhaust passage, and wherein the controller is configured to adjust a position of the second EGR valve based on the target intake fresh air fraction.

An embodiment of a method for an engine system includes transforming an intake oxygen concentration reference into a fresh air flow fraction reference or exhaust gas recirculation (EGR) fraction reference; determining a first valve position command for a first EGR valve and a second valve position command for a second EGR valve based on the fresh air flow fraction reference or the EGR fraction reference; setting a fresh air fraction command or EGR fraction command based on the first valve position command, the second valve position command, and output from one or more sensors of the engine system; and adjusting a position of the first EGR valve and a position of the second EGR valve based on the fresh air fraction command or the EGR fraction command. In an embodiment, the intake oxygen concentration reference is determined based on throttle position and exhaust NOx concentration. In an embodiment, setting the fresh air fraction command or EGR fraction command based on the first valve position command, the second valve position command, and output from one or more sensors of the engine system comprises: adjusting a position of the first EGR valve based on the first valve position command, and adjusting a position of the second EGR valve based on the second valve position command; measuring an actual position of the first EGR valve and an actual position of the second EGR valve; determining a fresh air fraction feedback value or an EGR fraction feedback value based on the actual position of the first EGR valve, the actual position of the second EGR valve, an intake manifold volumetric efficiency model, and an air-fuel ratio based intake fresh air fraction estimation; and setting the fresh air fraction command or EGR fraction command based on the fresh air fraction feedback value or the EGR fraction feedback valve and the fresh air fraction reference or the EGR fraction reference. In an embodiment, the adjusting of the position of the first EGR valve position is limited by the actual position of the second EGR valve.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for an engine having an intake manifold and a plurality of cylinders, comprising:
a controller storing instructions executable to adjust an exhaust gas recirculation (EGR) amount supplied to the engine to maintain a level of particulate matter (PM) in a determined PM range and a level of NOx in a determined NOx range by:
obtaining a base intake manifold oxygen concentration from a first map based on engine speed and/or engine load;
adjusting the base intake manifold oxygen concentration based on a brake-specific NOx value to obtain a target intake manifold oxygen concentration, the brake-specific NOx value determined from a NOx sensor feedback signal, engine speed, engine load, ambient humidity, an exhaust oxygen concentration, and a fuel quantity command;
converting the target intake manifold oxygen concentration to a target intake gas fraction; and
adjusting a position of an EGR valve based on the target intake gas fraction and a feedback value, the feedback value determined based on a measured EGR valve position and corrected in accordance with an intake manifold air flow rate.

2. The system of claim 1, wherein the target intake gas fraction is a fresh air fraction, wherein the feedback value is a fresh air fraction feedback value, and wherein the controller is configured to determine the fresh air fraction feedback value based on the measured EGR valve position, an intake manifold volumetric efficiency model, and an air-fuel ratio-based fresh air fraction estimation.

3. The system of claim 1, wherein the target intake gas fraction is an EGR fraction, wherein the feedback value is an EGR fraction feedback value, and wherein the controller is configured to determine the EGR fraction feedback value based on the measured EGR valve position, an intake manifold volumetric efficiency model, and an air-fuel ratio-based EGR fraction estimation.

4. The system of claim 1, wherein the controller is further configured to adjust fuel injection timing to maintain the level of PM within the determined PM range, wherein the fuel injection timing is determined based on a reference injection timing output from a second map and adjusted based on intake manifold temperature, the second map selected from among a plurality of second maps based on ambient temperature and pressure.

5. A method for an engine having an intake manifold and a plurality of cylinders, comprising:
with instructions executable by a controller, controlling an exhaust gas recirculation (EGR) amount supplied to the engine to maintain a level of particulate matter (PM) in a determined PM range and a level of NOx in a determined NOx range by:
adjusting a target intake manifold oxygen concentration based on a NOx sensor feedback signal;
converting the target intake manifold oxygen concentration to a target fresh air fraction; and
adjusting the position of an EGR valve based on the target fresh air fraction and a fresh air fraction feedback value, the fresh air fraction feedback value determined based on a measured EGR valve position, an intake volumetric efficiency model, and an air-fuel ratio-based fresh air fraction estimation.

6. The method of claim 5, wherein adjusting the target intake manifold oxygen concentration based on the NOx sensor feedback signal comprises adjusting the target intake manifold oxygen concentration based on a brake-specific NOx value, the brake-specific NOx value determined from the NOx sensor feedback signal, engine speed, engine load, ambient humidity, an exhaust oxygen concentration, and a fuel quantity command.

7. The method of claim 6, wherein adjusting the position of the EGR valve based on the target fresh air fraction and the fresh air fraction feedback value comprises determining an error between the target fresh air fraction and the fresh air fraction feedback value and outputting an EGR valve command based on the error.

8. The method of claim 6, wherein determining the fresh air fraction feedback value based on the measured EGR valve position, the intake manifold volumetric efficiency model, and the air-fuel ratio-based fresh air fraction estimation includes:
- determining a predictor fresh air fraction based on the measured EGR valve position;
- determining a corrector fresh air fraction by dividing a fresh air flow amount by a total air flow amount, the total air flow amount determined based on the intake manifold volumetric efficiency model, the fresh air flow amount determined based on an air-fuel ratio and a fuel flow;
- determining an error between the predictor fresh air fraction and the corrector fresh air fraction;
- filtering the error with a low-pass filter; and
- adding the filtered error to the predictor fresh air fraction to obtain the fresh air fraction feedback value.

9. The method of claim 5, further comprising, with the controller, adjusting fuel injection timing to maintain the level of PM within the determined PM range, wherein the fuel injection timing is determined based on a reference injection timing output from a map and adjusted based on intake manifold temperature, the map selected from among a plurality of maps based on ambient temperature and pressure.

10. A system, comprising:
- an engine having an intake manifold and a plurality of cylinders;
- an exhaust gas recirculation (EGR) passage configured to recirculate exhaust gas from at least a subset of the plurality of cylinders to the intake manifold; and
- a controller storing instructions executable to control an EGR amount supplied to the engine to maintain a level of particulate matter (PM) in a determined PM range and a level of NOx in a determined NOx range by:
  - adjusting a target intake manifold oxygen concentration based on a NOx sensor feedback signal;
  - converting the target intake manifold oxygen concentration to a target EGR fraction; and
  - adjusting a position of an EGR valve based on the target EGR fraction and an EGR fraction feedback value, the EGR fraction feedback value determined based on a measured EGR valve position, an intake manifold volumetric efficiency model, and an air-fuel ratio-based EGR fraction estimation.

11. The system of claim 10, wherein adjusting the target intake manifold oxygen concentration based on the NOx sensor feedback signal comprises adjusting the target intake manifold oxygen concentration based on a brake-specific NOx value, the brake-specific NOx value determined from the NOx sensor feedback signal, engine speed, engine load, ambient humidity, an exhaust oxygen concentration, and a fuel quantity command.

12. The system of claim 10, wherein the controller is further configured to adjust fuel injection timing to maintain the level of PM within the determined PM range, wherein the fuel injection timing is determined based on a reference injection timing output from a map and adjusted based on intake manifold temperature, the map selected from among a plurality of maps based on ambient temperature and pressure.

13. A vehicle comprising the system of claim 10.

* * * * *